United States Patent [19]

Jaffee et al.

[11] Patent Number: 6,006,079
[45] Date of Patent: Dec. 21, 1999

[54] RADIO HAVING A FAST ADAPTING DIRECT CONVERSION RECEIVER

[75] Inventors: James I. Jaffee, Solana Beach, Calif.; Walter Grandfield, Phoenix; George Smoot, Gilbert, both of Ariz.

[73] Assignee: Motorola, Inc., Schaumburg, Ill.

[21] Appl. No.: 08/876,161

[22] Filed: Jun. 13, 1997

[51] Int. Cl.$^6$ .................................................. H04B 1/10
[52] U.S. Cl. ........................ 455/310; 455/312; 455/324
[58] Field of Search ............................... 455/324, 339, 455/343, 38.3, 232.1, 234.1, 295, 296, 182.1, 192.1, 303, 307, 310, 312, 266, 340

[56] References Cited

U.S. PATENT DOCUMENTS

| | | | |
|---|---|---|---|
| 5,422,889 | 6/1995 | Sevenhans et al. | 455/324 |
| 5,448,774 | 9/1995 | Yokazaki et al. | 455/343 |
| 5,507,036 | 4/1996 | Vagher | 455/304 |
| 5,548,068 | 12/1996 | Mohindra | 455/324 |
| 5,557,642 | 9/1996 | Williams | 455/339 |
| 5,568,520 | 10/1996 | Lindquist et al. | 455/324 |

*Primary Examiner*—Nguyen Vo
*Attorney, Agent, or Firm*—James A. Lamb

[57] ABSTRACT

A direct conversion receiver (200) is capable of recovering a filtered baseband signal (295) from a radio signal (201) modulated with a baseband signal (202). The direct conversion receiver (200) comprises a radio frequency mixer (205) for converting the radio signal (201) to the baseband signal (202), a lowpass amplifier (210) DC coupled to the radio frequency mixer (205), that amplifies the baseband signal (202) and substantially attenuates components of the baseband signal above a high corner frequency, and a DC offset compensation section (225) DC coupled to the lowpass amplifier (210), that provides a DC offset compensation and a controlled highpass filtering of the baseband signal. A low corner frequency of the DC offset compensation section is smoothly varied from a predetermined maximum value to a predetermined minimum value during a low frequency, low energy portion of the signaling protocol.

9 Claims, 2 Drawing Sheets

RADIO HAVING A FAST ADAPTING DIRECT CONVERSION RECEIVER

FIELD OF THE INVENTION

This invention relates in general to direct conversion receivers and in particular to direct conversion radio receivers used in synchronous communication systems

BACKGROUND OF THE INVENTION

Known means of recovering digital signals from a radio signal which has been frequency modulated by the digital signal include direct conversion receivers, in which the last stage of conversion is to a baseband signal rather than to a low frequency signal, as in more conventional receivers. In a direct conversion receiver, the baseband signal is amplified and filtered, and then demodulated by analog signal analysis, using digital signal processing techniques. In a more conventional receiver, amplification and filtering is provided in two or more conversion stages and a discriminator circuit is used for demodulation. The use of a direct conversion approach lends itself more readily to a more integrated receiver having fewer integrated circuits.

DC offset is problematic in a direct conversion receiver, in which the mixer output is generally DC coupled through the baseband filter and amplifier(s). This DC coupling is required in order to provide an integrated circuit which does not require the addition of either large onchip capacitors or pads to off-chip capacitors. DC offset is caused by local oscillator (LO) to radio frequency (RF) leakage in the baseband converting mixer and transistor mismatch in a mixer and the baseband filter. The DC offset in combination with large DC gain can cause the baseband filter to exceed its dynamic range. For example, in a receiver running off a one volt supply a typical maximum baseband filter signal is 200 millivolts (mV) peak to peak. With a baseband amplifier gain of 70 decibels (dB), a DC offset greater than approximately 63 microvolts (uV) at the input of the baseband amplifier will overload the baseband filter. Mixer output offset due to LO to RF leakage and transistor mismatch can exceed 2 mV, which is much greater than the allowable 63 uV.

A past approach to resolving the DC offset problem has been to wrap a DC offset correction circuit around the amplifier, which establishes a low corner frequency (alternatively described as the highpass frequency) for the baseband signal, below which the bandpass signal is significantly attenuated (e.g., 70 decibels). The low corner frequency must be low enough to allow reliable recovery of the baseband signal for all anticipated combinations of data. In the well known FLEX™ protocol, when operating at 4800 bits per second, the required low corner frequency is less than 100 Hertz (Hz). A large capacitor has been used in such DC offset correction circuits to attain this low corner frequency. The settling time of such a circuit is on the order of 50 milliseconds. Providing for such a long settling time can impact pager battery life and scan time in roaming pagers. An improvement used in some data receivers is to provide two highpass corner frequencies, e.g., 100 Hz and 1 KiloHertz (KHz), and switch from the higher frequency to the lower frequency after synchronization is completed. Such an approach requires the switching of capacitors or transconductance and introduces a rapid change of bandwidth. The rapid change of bandwidth typically causes a similar effect as a DC offset, which also slows the response time.

Thus, what is needed is a means to provide a DC offset correction in a direct conversion receiver while at the same time having a fast response time,

DETAILED DESCRIPTION OF THE DRAWINGS

Figure 1:
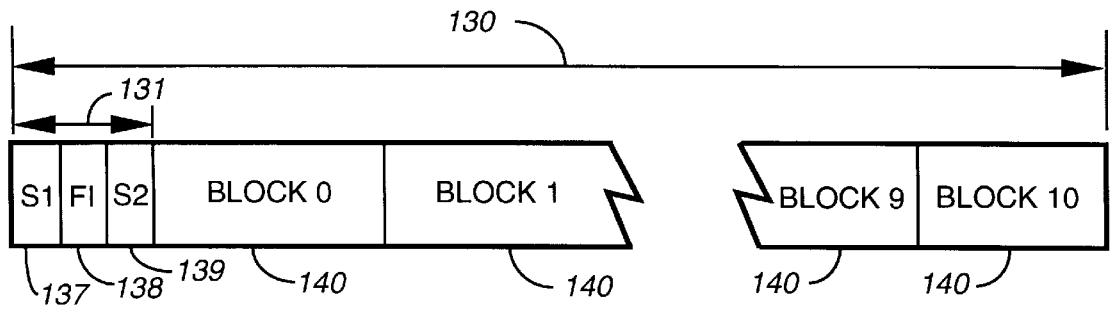
FIG. 1 shows a timing diagram which illustrates features of the transmission format of a frame of the well known FLEX outbound signaling protocol, in accordance with the preferred embodiment of the present invention.

Referring to FIG. 1 a timing diagram which illustrates features of the transmission format of a frame of the well known FLEX outbound signaling protocol is shown, in accordance with the preferred embodiment of the present invention. (The FLEX signaling protocol is licensed by Motorola, Inc., of Schaumburg, Ill.) The outbound signaling protocol is used in a radio signal which is received by a receiver 200 of a radio 300 described herein below, with reference to FIGS. 2 and 3. The FLEX outbound signaling protocol is subdivided into protocol divisions, which are an hour, a cycle, a frame 130, a block 140, and a word. Fifteen 4 minute uniquely identified cycles are normally transmitted in each hour. One hundred twenty eight 1.875 second uniquely identified frames 130 are normally transmitted in each of the cycles. One synchronization (sync) signal 131 lasting one hundred fifteen milliseconds and 11 one hundred sixty millisecond uniquely identified blocks 140 are transmitted in each of the frames 130. The synchronization signal 131 includes a first sync portion 137, a frame information word 138, and a second sync portion 139. A bit rate of 1600 bits per second (bps), 3200 bps, or 6400 bps is usable during the blocks 140 of each frame 130. The set of 11 blocks 140 form an information portion of the frame 130. The bit rate of the blocks 140 of each control frame 130 is communicated to the radio 300 during the synchronization signal 131.

It will be appreciated that the synchronization signal 131 is provided so that a radio in which the receiver has been off for a predetermined maximum time can re-establish synchronization with the outbound signaling protocol within the synchronization signal 131 of one frame 130,. For example, when a pager is used in a FLEX communication system, a battery saving function is typically used in which the receiver of the pager is off for 127 out of every 128 frames. During this time period of approximately four minutes, the pager can become unsynchronized with respect to the outbound channel radio signal by a worst case amount which is predictable, based on the components used in the reference oscillator of a radio transmitting the outbound channel radio signal and the reference oscillator of the pager's receiver. The first sync portion 137 comprises one hundred twelve bits which are always transmitted at 1600 bits per second, and modulated using two level frequency modulation (FM). The first thirty two bits are a 1, 0, 1, 0. The frame information word 138, which comprises 32 bits, is also transmitted at 1600 bits per second and modulated using two level FM with deviations of ±4800 Hertz (Hz). The second sync portion 139 comprises sync patterns sent using the data rate which is used throughout the remainder of the frame 130, i.e., 1600, 3200 or 6400 bits per second. However, the second sync portion 139 always begins with a 1, 0, 1, 0 repeating pattern. It will be appreciated that, as a result of the first thirty two bits of the first sync portion 137 being a 1, 0, 1, 0 repeating pattern at modulation frequencies of ±4800

Hz, there is essentially no direct current (DC) component of the signal during those 32 bits (20 milliseconds), and that the energy at frequencies below 1000 Hz is also minimal. After the first thirty two bits, the pattern in the first sync portion 137 is no longer a repeating 1, 0, 1, 0 repeating pattern. Thus, it can be appreciated that the amount of energy that needs to be recovered from frequency components of the baseband signal below 1000 Hz starts off very low and increases during the first sync portion 137 and the frame information word 138. An increasingly substantial portion of the energy of the baseband signal 202 in the frequency range from 100 Hz to 1000 Hz needs to be recovered as the portion of the signal being recovered changes from the first 32 bits of the first sync portion 137 to the information portion, to avoid an introduction of errors by the receiver 200 during the information portion, when the information portion includes typical data transmitted at the highest bit rates used for the information portion. The period of 20 milliseconds during the 32 bit repeating 1, 0, 1, 0 pattern, in which there is substantially less energy in the low frequency components of the baseband signal than the amount of energy that exists in the low frequency components of the baseband signal during the information portion of the signaling protocol, is alternatively described as a low frequency, low energy period of the signaling protocol.

Figure 2:
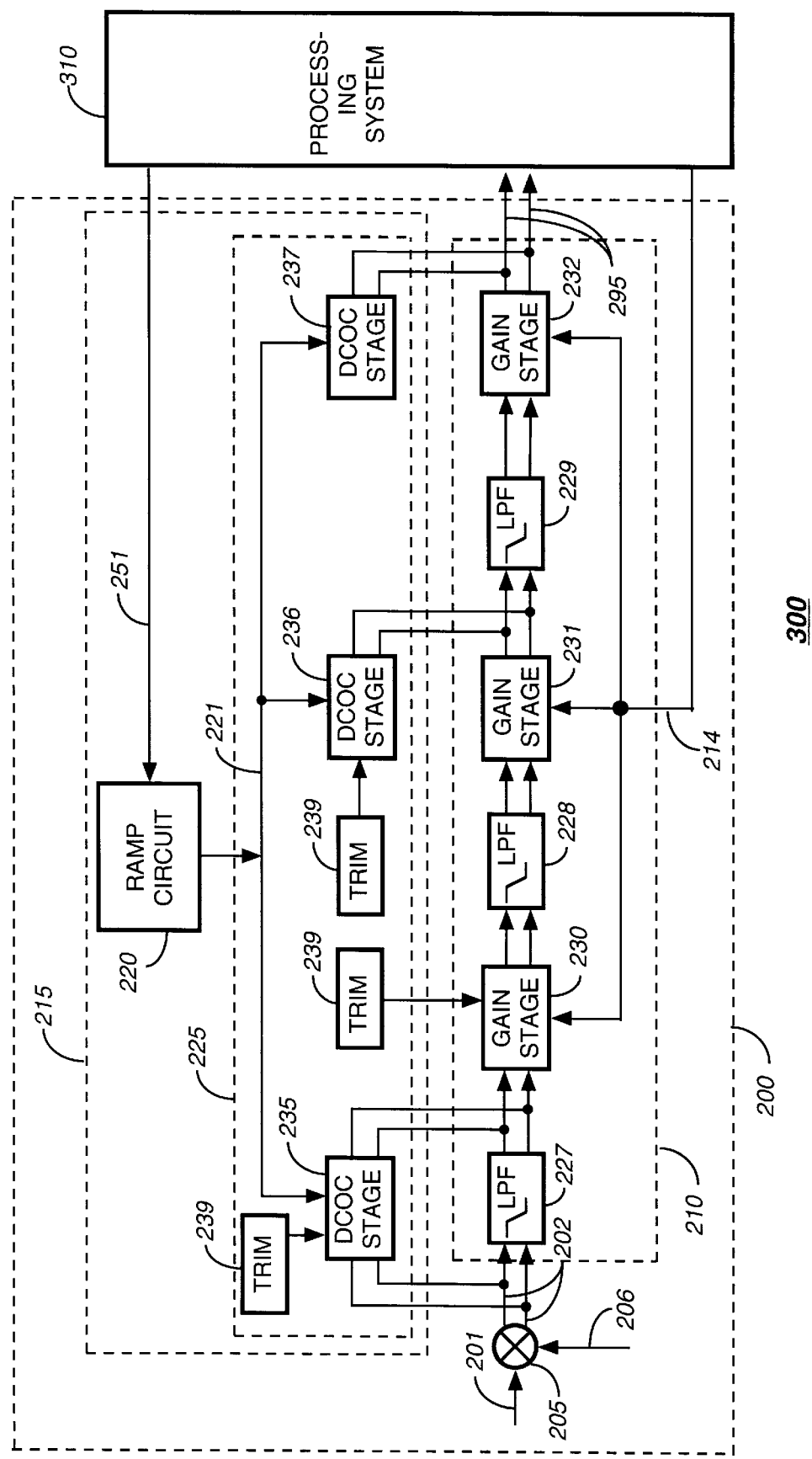
FIG. 2 shows an electrical block diagram of a receiver and other portions of a radio, in accordance with the preferred embodiment of the present invention.

Referring to FIG. 2, an electrical block diagram of a radio 300 including a receiver 200 and a processing system 310 is shown, in accordance with the preferred embodiment of the present invention. The receiver 200 is a direct conversion receiver which comprises a radio frequency mixer 205, a lowpass amplifier 210, and a direct current (DC) offset compensation section 215. A radio signal 201 having a carrier frequency, $f_c$, is coupled from a receiving antenna (not shown in FIG. 2) to the mixer 205. A local oscillator signal 206, which is generated to have essentially the same frequency as $f_c$ is coupled to the mixer 205, where it is mixed with the radio signal 201, generating a nominally baseband signal 202 which is DC coupled to the lowpass amplifier 210. To the extent there is any error between the frequency of the local oscillator signal 206 and $f_c$, a DC offset exists within the baseband signal 202. The lowpass amplifier 210 provides up to 68 decibels (dB) of gain for the baseband signal, as well as providing low pass filtering of the baseband signal 202 to substantially attenuate components of the baseband signal 202 above a high corner frequency of approximately 8.5 KiloHertz (KHz).

The DC offset compensation section 215 is DC coupled to the lowpass amplifier 210, and provides DC offset compensation as well as highpass filtering having a low corner frequency which is controlled by the DC offset compensation section 215 in response to a change of state of a control signal 251 generated by the processing system 310 and coupled to the DC offset compensation section 215. The control signal 251 indicates the beginning of the synchronization portion of the frame 130. The baseband signal, after being amplified and filtered is coupled as filtered baseband signal 295 to the processing system 310.

The lowpass amplifier 210 comprises two conventional 19 dB gain stages 230, 231, one conventional 30 dB gain stage 232, and three conventional low pass filters (LPF) 227, 228, 229 which provide composite filter characteristics in a conventional manner having the corner frequency of approximately 8.5 KHz. An input of the LPF 227 is DC coupled to the mixer 205 and an output of the LPF 227 is DC coupled to an input of the 19 dB gain stage 230, an output of which is DC coupled to an input of the LPF 228, an output of which is DC coupled to an input of the 19 dB gain stage 231, an output of which is DC coupled to an input of the LPF 229, a output of which is DC coupled to an input of the gain stage 232, an output of which is DC coupled to the processing system 310. An automatic gain control signal 214 is coupled to each of the gain stages 230, 35 231, 232 for changing the overall gain of the receiver 200 in response to the strength of the radio signal 201, in a conventional manner.

The DC offset compensation section 215 comprises a ramp circuit 220 and a controllable DC offset compensation circuit 225. The control signal 251 is coupled from the processing system 310 to the ramp circuit 220, which generates a bandwidth ramp signal 221 which is coupled to the controllable DC offset compensation circuit 225. The controllable DC offset compensation circuit 225 provides a steady state (residual) DC offset compensation and a dynamic DC compensation to eliminate DC offsets in the lowpass amplifier 210 and also provides a highpass filtering which has a low corner frequency that is related to the bandwidth ramp signal 221.

The controllable DC offset compensation circuit 225 comprises three DC offset compensation (DCOC) stages 235, 236, 237 and three trim circuits 239. A trim circuit 239 is coupled to each of the two DCOC stages 235, 236, and the third trim circuit 239 is coupled to the gain stage 230. The three trim circuits 239 are adjusted during a maintenance operation to substantially eliminate residual DC offsets in the receiver 200 caused by parts tolerances of the components used in the receiver, such as the mixer 205, the gain stages 230, 231, 232, and the LPFs 227, 228, 229. The DCOC stage 235 is DC coupled to the output of mixer 205 and the output of LPF 227. The DCOC stage 235 is a conventional gyrator that is configured so as to provide a DC attenuation of DC offsets occurring at the output of the mixer 205 and to also provide an essentially inductive choke across the output of LPF 227. The DC attenuation provided by DCOC stage 235 reduces changes in DC levels at the output of the mixer 205 caused by changes in RF levels, and changes in leakages between the local oscillator signal 206 and radio signal 201. These changes in DC levels are reduced by approximately 50 Decibels (dB), so that, for example, a 2 mV DC offset at the output of the mixer 205 is reduced to approximately 6.3 uV. The inductive load by DCOC stage 235 causes a highpass filtering of the baseband signal 202 at the output of LPF 227. The highpass filtering has a low corner frequency which is controllable by the bandwidth ramp signal 221. The DCOC stage 236 is DC coupled to the output of gain stage 231, and DCOC stage 237 is DC coupled to the output of gain stage 232. Each of the DCOC stages 236, 237 is a conventional gyrator that is configured so as to provide a DC attenuation of DC offsets occurring at the output of the respective gain stages 231, 232, and also to provide an essentially inductive choke across the outputs of gain stages 231, 232. The DCOC stages 236, 237 reduce DC offsets to a minimum at the outputs of the gain stages 231, 232 and cause a highpass filtering of the baseband signal 202 for each gain stage 231, 232. The highpass filtering has a low corner frequency which is controllable by the bandwidth ramp signal 221. In accordance with the preferred embodiment of the present invention, the bandwidth ramp signal 221 uniquely controls the DCOC stages 235, 236, 237 to vary the low corner frequency smoothly. The preferred characteristic of the smooth variance of the corner frequency is a constant rate of change with respect to time. However, alternative characteristics of the smooth variance can be used which achieve essentially the same benefit (a rapid synchronization to the synchronous protocol), such as a logarithmic change of the corner frequency with respect to time. Thus, in summary, the DC offset compensation section 225, which is DC coupled to the lowpass amplifier 210, provides a DC offset compensation and a controlled highpass filtering of the baseband signal 202, in which a low corner frequency of the DC offset compensation section 225 is smoothly varied from a predetermined maximum value to a predetermined minimum value during a low frequency, low energy portion of the signaling protocol. Each of the DC offset compensation stages 235, 236, 237 provides a portion of the DC offset compensation and provides a highpass filtering of the baseband signal 202 at the low corner frequency.

It will be appreciated that the benefits provided by the smooth ramping of the low corner frequency in accordance with the preferred embodiment of the present invention are achievable in alternative embodiments wherein the lowpass amplifier 210 has one or more gain stages but not necessarily three gain stages, and the DC offset compensation section 225 has a plurality of DCOC stages less than or equal the number of gain stages, each DCOC stage coupled to an output of one of the gain stages, or wherein the composite low pass filtering function, which is provided in the preferred embodiment of the present invention by LPF's 227, 228, 229, is alternatively provided by gain stages which incorporate the low pass filtering within the gain stages, in a conventional manner.

Figure 3:
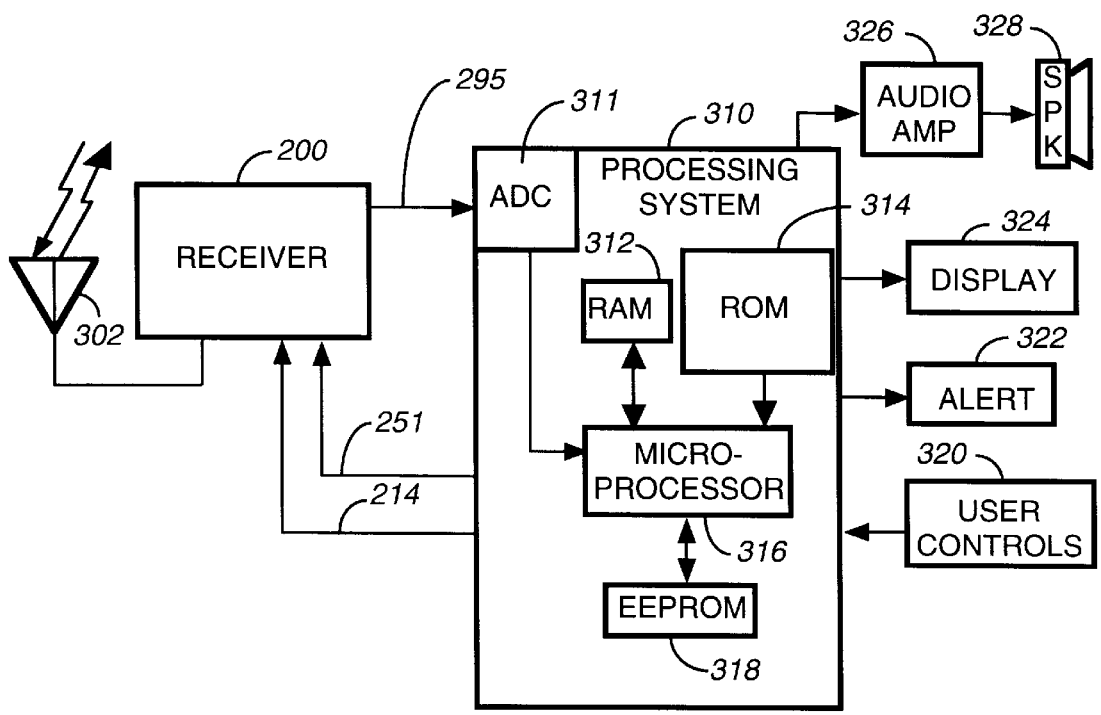
FIG. 3 shows an electrical block diagram of the radio of FIG. 2, in accordance with the preferred embodiment of the present invention.

Referring to FIG. 3, an electrical block diagram of the radio 300 is shown, in accordance with the preferred embodiment of the present invention. The radio 300 comprises a receiver antenna 302 for intercepting radio frequency (RF) signals. The receiver antenna 302 is coupled to the receiver 200. The received RF signals are modulated with information in accordance with the FLEX protocol, using conventional two and four-level frequency shift keying (FSK). Radio signals received by the receiver 200 are converted to a filtered baseband signal 295 at the output of the receiver 200. The filtered baseband signal 295 is coupled to the input of a processing system 310, which processes outbound messages.

To perform the functions of the radio 300, the processing system 310 includes a microprocessor 316, a random access memory (RAM) 312, a read only memory (ROM) 314, an electrically erasable and programmable ROM (EEPROM) 318, and an analog to digital converter (ADC) 311. Preferably, the microprocessor 316 is similar to the DSP56100 digital signal processor (DSP) manufactured by Motorola, Inc. It will be appreciated that other similar processors can be utilized for the microprocessor 316, and that additional processors of the same or alternate type can be added as required to handle the processing requirements of the processing system 310. It will be appreciated that other types of memory, e.g., EEPROM or FLASH, can be utilized for the ROM 314, as well as the RAM 312. It will be further appreciated that the RAM 312 and the ROM 314, singly or in combination, can be integrated as a contiguous portion of the microprocessor 316.

The microprocessor 316 is programmed by way of the ROM 314 to process incoming messages on the outbound channel. During outbound message processing, the microprocessor 316 samples the demodulated signal generated by the receiver 200 by using the ADC 311 for converting the baseband signal to a sampled analog signal, which is demodulated by the microprocessor 316 under control of the program instructions in the ROM 314 in a conventional manner.

After the radio 300 becomes active in a radio system (e.g., after the user applies power to the radio 300 and the radio 300 is within operating range of a radio system transmitting antenna), the processing system 310 operates the radio 300 in a battery saving mode. In the battery saving mode, the processing system 310 typically deactivates the receiver 200 during 127 of every 128 frames 130 by setting the state of control signal 251 to inactive. The control signal 251 is coupled to circuits other than the ramp control 220, for controlling the power state of the entire receiver 200. At the estimated start of a predetermined frame 130 that is intended for the radio 300, the processing system 310 changes the state of the control signal 251 to an active state, and the receiver 200 is powered up, in a conventional manner, and begins receiving the radio signal 201. When the control signal 251 changes to the active state, the ramp circuit 220 initiates a control mode in which the bandwidth ramp signal 221 is changed from a maximum value which establishes a low frequency corner of 1000 Khz in the receiver 200 for baseband signal 202, to a minimum value which establishes a low frequency corner of 100 Hz in the receiver 200 for baseband signal 202, by controlling the common low corner frequencies of DCOCs 235, 236, 237. The bandwidth of the receiver 200 is uniquely controlled to change smoothly from the high value to the low value of the low frequency corner. The smooth change avoids the effect of an essentially instantaneous change of bandwidth, which is a similar effect as that caused by an essentially instantaneous DC offset. This advantageously speeds up the acquisition of synchronization. In accordance with the preferred embodiment of the present invention, the change of the low corner frequency with respect to time is done linearly.

When the microprocessor 316 decodes an address in the demodulated data of the outbound message, it compares the decoded address with one or more addresses stored in the EEPROM 318, and when a match is detected, the microprocessor 316 proceeds to process the remaining portion of the message.

Once the microprocessor 316 has processed the message, it stores the message in the RAM 312, and a call alerting signal is generated to alert a user that a message has been received. The call alerting signal is directed to a conventional audible or tactile alerting device 322 for generating an audible or tactile call alerting signal.

The message can be accessed by the user through user controls 320, which provide functions such as lock, unlock, delete, read, etc. More specifically, by the use of appropriate functions provided by the user controls 320, the message is recovered from the RAM 312, and then displayed on a display 324, e.g., a conventional liquid crystal display (LCD), or played out audibly, in the case of a voice message, by the combination of an audio amplifier 326 and a speaker 328.

It will be appreciated that the processing system can be alternatively implemented without the microprocessor 316, by implementing the conventional and unique functions described herein with a combination of conventionally available off the shelf integrated circuits such as CMOS shift registers, clocks, gates, counters, DAC, ADC, and RAM, and that further, some or all of the conventionally available off the shelf integrated circuits used to implement the processing system can be alternatively implemented in an application specific integrated circuit. It will be further appreciated that the microprocessor 316 can alternatively be a conventional microprocessor, such as a microprocessor in the family of 68HC11 microprocessors manufactured by Motorola, Inc., of Schaumburg, Ill.

It will be further appreciated that the ramp circuit 220 of the receiver 200 can alternatively be incorporated into the processing system 310 as a digitally generated signal, when the processing system 310 includes a digital to analog conversion capability.

It will be further appreciated that the use of a smoothly changing low corner frequency to accomplish an increased speed of synchronism is useful in other synchronous protocols, and that other control relationships for the change of bandwidth could be used, for example, a logarithmic relationship, with similar beneficial results. It will be further appreciated that a delay before starting the smooth change could be beneficially added in some protocols. The choice of these alternative embodiments can provide advantages when used for the FLEX signaling protocol or for other synchronous signaling protocols.

It will be further appreciated that the control signal 251 can alternatively be provided as two control signals: a power control signal to activate and deactivate power to the receiver 200, and a separate control signal which indicates a appropriate time to initiate the generate of the bandwidth ramp signal 221. For instance, it may not be necessary to perform a wide (1000 Hz) to narrow (100 Hz) low corner frequency change at every power up of the receiver, when the radio 300 is being operated in a mode of more frequent power ups. Or, for example, a period of low frequency, low energy that is appropriate for change of the low corner frequency of the receiver 200 may occur within a signaling protocol at a time other than when power is applied.

By now it should be appreciated that there has been provided a radio 300 in which the receiver 200 is uniquely designed to provide a fast synchronization to a synchronous protocol having a low frequency, low energy state during which the low corner frequency of the receiver is changed smoothly from wide to narrow.

We claim:

1. A direct conversion receiver capable of recovering a filtered baseband signal from a radio signal modulated with a baseband signal representing a signaling protocol, comprising:
   a radio frequency mixer for converting the radio signal to the baseband signal;
   a lowpass amplifier DC coupled to said radio frequency mixer, that amplifies the baseband signal and substantially attenuates components of the baseband signal above a high corner frequency; and
   a DC offset compensation section DC coupled to said lowpass amplifier, that provides a DC offset compensation and a controlled highpass filtering of the baseband signal wherein a low corner frequency of said DC offset compensation section is smoothly varied from a predetermined maximum value to a predetermined minimum value during a low frequency, low energy period of the signaling protocol.

2. The direct conversion receiver according to claim 1, wherein the low corner frequency is smoothly varied at an essentially constant rate.

3. The direct conversion receiver according to claim 1, wherein the low corner frequency is smoothly varied at an essentially logarithmic rate.

4. The direct conversion receiver according to claim 1, wherein the predetermined maximum value is 1000 Hertz, and the predetermined minimum value is 100 Hertz.

5. A radio that comprises the direct conversion receiver recited in claim 1.

6. A direct conversion receiver capable of recovering a filtered baseband signal from a radio signal modulated with a baseband signal representing a signaling protocol, comprising:
   a radio frequency mixer for converting the radio signal to the baseband signal;
   a lowpass amplifier DC coupled to said radio frequency mixer, that amplifies the baseband signal and substantially attenuates components of the baseband signal above a high corner frequency; and
   a DC offset compensation section DC coupled to said lowpass amplifier, that provides a DC offset compensation and a controlled highpass filtering of the baseband signal wherein a low corner frequency of said DC offset compensation section is smoothly varied from a predetermined maximum value to a predetermined minimum value during a low frequency, low energy period of the signaling protocol,
   wherein the low frequency, low energy period of the signaling protocol is a synchronization portion, and wherein a low frequency energy content of the synchronization portion is substantially less than a low frequency energy content of an information portion of the signaling protocol.

7. The direct conversion receiver according to claim 6, wherein the low frequency energy content is the energy of frequency components of the baseband signal from approximately 100 Hertz to approximately 1000 Hertz.

8. A direct conversion receiver capable of recovering a filtered baseband signal from a radio signal modulated with a baseband signal representing a signaling protocol, comprising:
   a radio frequency mixer for converting the radio signal to the baseband signal;
   a lowpass amplifier DC coupled to said radio frequency mixer, that amplifies the baseband signal and substantially attenuates components of the baseband signal above a high corner frequency; and
   a DC offset compensation section DC coupled to said lowpass amplifier, that provides a DC offset compensation and a controlled highpass filtering of the baseband signal wherein a low corner frequency of said DC offset compensation section is smoothly varied from a predetermined maximum value to a predetermined minimum value during a low frequency, low energy portion of the signaling protocol, the DC offset compensation section comprising:
      a ramp circuit that generates a bandwidth ramp signal in response to a control signal that indicates the low frequency, low energy portion of the signaling-protocol; and
      a controlled DC offset compensation circuit coupled to the ramp circuit, that provides DC offset compensation and controlled highpass filtering of the baseband signal, wherein the controlled highpass filtering has the low corner frequency, and wherein the low corner frequency is proportional to the bandwidth ramp signal.

9. A direct conversion receiver capable of recovering a filtered baseband signal from a radio signal modulated with a baseband signal representing a signaling protocol, comprising:
   a radio frequency mixer for converting the radio signal to the baseband signal;
   a lowpass amplifier DC coupled to said radio frequency mixer, that amplifies the baseband signal and substantially attenuates components of the baseband signal above a high corner frequency, wherein said lowpass amplifier comprises one or more gain stages; and
   a DC offset compensation section DC coupled to said lowpass amplifier, that provides a DC offset compensation and a controlled highpass filtering of the baseband signal wherein a low corner frequency of said DC offset compensation section is smoothly varied from a predetermined maximum value to a predetermined minimum value during a low frequency, low energy portion of the signaling protocol; and wherein said DC offset compensation section comprises one or more DC offset compensation stages, each coupled to an output of different ones of said one or more gain stages, and wherein each of said one or more DC offset compensation stages provides a portion of the DC offset compensation and provides a highpass filtering of the baseband signal at the low corner frequency.

* * * * *